United States Patent
Dunkmann et al.

(10) Patent No.: US 9,656,813 B2
(45) Date of Patent: May 23, 2017

(54) SYSTEM FOR HANDLING WORKPIECES AND METHOD FOR OPERATING SUCH A SYSTEM

(71) Applicant: J. Schmalz GmbH, Glatten (DE)

(72) Inventors: Walter Dunkmann, Baden-Baden (DE); Thomas Holecek, Freudenstadt (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/749,136

(22) Filed: Jun. 24, 2015

(65) Prior Publication Data

US 2015/0375401 A1    Dec. 31, 2015

(30) Foreign Application Priority Data

Jun. 26, 2014    (DE) .......................... 10 2014 212331

(51) Int. Cl.
*B65G 47/91*    (2006.01)
*B25J 15/06*    (2006.01)
(Continued)

(52) U.S. Cl.
CPC ........ *B65G 47/917* (2013.01); *B25J 15/0061* (2013.01); *B25J 15/0616* (2013.01);
(Continued)

(58) Field of Classification Search
CPC .... B65G 47/917; B65G 47/918; B65G 47/91; B25J 15/0625
See application file for complete search history.

(56) References Cited

U.S. PATENT DOCUMENTS 4,650,234 A * 3/1987 Blatt ...................... B21D 43/18
                                              294/65
5,059,088 A * 10/1991 Klein ...................... B65G 47/917
                                              294/186
(Continued)

FOREIGN PATENT DOCUMENTS

DE           69232566        12/2002
DE         102004031924       1/2006
(Continued)

OTHER PUBLICATIONS

European Patent Office Search Report dated Apr. 19, 2016 issued in counterpart EP patent application No. 15171880.6 (7 pages).

*Primary Examiner* — Thomas Randazzo
(74) *Attorney, Agent, or Firm* — Ware, Fressola, Maguire & Barber, LLP

(57) ABSTRACT

The invention relates to a system (10) for handling workpieces, with a handling device (12) which comprises at least one vacuum gripper (16) for drawing a workpiece in by suction, with at least one vacuum generator (26) that can be operated by the supply of compressed air for supplying the vacuum gripper (16) with vacuum, with at least one controllable control valve (28) by which the supply of compressed air to the vacuum generator (26) can be controlled, wherein the control valve (28) is associated with a control device (30) for the proper control of the control valve (28 as required. The handling device comprises an evaluation unit (32) for evaluating operating data of the vacuum generator (26) and/or for evaluating operating data of the handling device (12) as well as for generating control signals as a function of the evaluated operating data, wherein the evaluation unit (32) is arranged on the handling device (12), and (Continued)

wherein the control device (30) controls the control valve (28) as a function of the control signals transmitted from the evaluation unit (32).

14 Claims, 2 Drawing Sheets

(51) Int. Cl.
 *B25J 15/00* (2006.01)
 *F04F 5/52* (2006.01)
(52) U.S. Cl.
 CPC ....... *B25J 15/0625* (2013.01); *B25J 15/0675* (2013.01); *B65G 47/91* (2013.01); *F04F 5/52* (2013.01); *B65G 47/918* (2013.01)

(56) References Cited

U.S. PATENT DOCUMENTS

| | | | | |
|---|---|---|---|---|
| 5,188,411 | A * | 2/1993 | Golden | B65G 47/91 137/487.5 |
| 5,284,416 | A * | 2/1994 | Schmidt | B25J 15/0616 294/185 |
| 5,470,117 | A * | 11/1995 | Schmidt | B25J 15/0616 294/185 |
| 5,566,718 | A | 10/1996 | Nagai et al. | |
| 5,601,415 | A | 2/1997 | Nagai et al. | |
| 7,677,622 | B2 * | 3/2010 | Dunkmann | B65G 47/917 294/188 |
| 8,550,790 | B2 * | 10/2013 | Tell | B65G 47/911 269/21 |
| 8,560,121 | B2 * | 10/2013 | Hjornet | B25J 15/0616 198/468.4 |
| 8,855,818 | B2 * | 10/2014 | Hashimoto | B25J 13/087 700/245 |
| 2008/0202602 | A1 * | 8/2008 | Flaim | B25J 15/0052 137/488 |
| 2008/0291235 | A1 | 11/2008 | Schmalz | |
| 2010/0303641 | A1 | 12/2010 | Medow et al. | |
| 2015/0147141 | A1 * | 5/2015 | Truyens | B25J 15/0052 414/222.07 |

FOREIGN PATENT DOCUMENTS

| | | |
|---|---|---|
| DE | 102004047853 | 4/2006 |
| DE | 102007058114 | 6/2009 |

* cited by examiner

SYSTEM FOR HANDLING WORKPIECES AND METHOD FOR OPERATING SUCH A SYSTEM

BACKGROUND OF THE INVENTION

Field of Invention

The invention relates to a system for handling workpieces and to an operating method.

Such systems can be used, e.g. in production assembly lines or processing assembly lines. The systems comprise in particular a handling device with which a workpiece can be fixed or grasped. The handling device itself can be complexly constructed, e.g. it can comprise a plurality of vacuum grippers. Furthermore, an actuator is often provided, e.g. a robotic arm that is coupled to the handling device in order to move it.

SUMMARY OF THE INVENTION

The present invention relates in particular to pneumatically operated systems that comprise at least one vacuum generator (e.g., driven by compressed air) which supplies the handling devices (e.g. vacuum grippers) with the required vacuum. During the operation of such systems the individual functional units must be coordinated with each other. In particular, the operating data of the handling device must be known in order to be able to supply it with the proper vacuum by the vacuum generator. To this end it is known, e.g. to connect the vacuum generators via bus system to a central control device. This device generates and transmits control signals to the vacuum generators in order to control them in a manner proper for the process. In order to make this possible even the handling devices connected to the vacuum generators must be reported to the central control so that their operating parameters and status information can be accessed. A replacing of the handling device in the system therefore makes configuration work necessary. A retrofitting of the system is often associated with undesirably long standstill times.

The invention is based on the problem of making available a system for handling workpieces that can be reliably operated and monitored and which can be flexibly retrofitted.

This problem is solved by a system for handling workpieces according to the present invention. The system comprises several functional units that can be combined, e.g. into structural groups:

A handling device that serves for the actual handling (i.e. fixing or gripping) of the workpiece and which comprises at least one vacuum gripper for drawing in the workpiece by suction;

At least one vacuum generator which can be operated by the supplying of compressed air and which serves to supply the vacuum gripper with the necessary vacuum;

At least one controllable control valve for controlling the supply of compressed air for the vacuum generator. The control valve acts in so far between a central compressed air supply system of the system and the vacuum generator;

A control device which is constructed to control the control valve as required and which is associated with the control valve.

An evaluation unit is arranged on the handling device which unit is constructed so as to evaluate operating data of the vacuum generator and/or operating data of the handing device and to generate control signals as a function of the evaluated operating data. The control device cooperates with the control valve in such a manner that the control signal are transmitted to the control valve and the control valve is regulated as a function of these control signals.

Therefore, only the control valve, which is fluidically placed in front of the vacuum generator, is directly controlled by the evaluation unit. To this extent it is not obligatorily necessary to control the more complex vacuum generator from a central control device of the system, as is the case in known systems. The control process is therefore less complex. The control valve receives the control signals directly from the associated evaluation unit that determines the control signals from the operating data. Therefore, a decentralized control of the control valve takes place.

The equipment in accordance with the claims makes it possible to arrange the vacuum generator or vacuum generators in the vicinity of the vacuum gripper. Therefore, the required paths for compressed air lines and vacuum lines are short. Therefore, for changes to the vacuum status in the vacuum grippers only short line sections have to be evacuated and/or loaded with pressure, which leads to distinctly shortened reaction times. In particular, the evacuation time for the vacuum gripper for gripping a workpiece can be distinctly shortened.

Since the operating data is directly processed in the evaluation unit, it is not necessary to transmit disturbance-prone analog signals (which represent operating data) by long data lines to a central control device. Instead of this, short data lines can be used between the evaluation unit and the vacuum generator and/or the handling device and/or appropriate sensors. This results in a reliable operation and furthermore in a savings of cost by the data lines saved. Moreover, the evaluation device locally evaluates the particular data on the handling device and controls the control valve in particular by digital signals (e.g. on and off times for supplying media). This can simplify the system control.

During retrofitting of the system (e.g. replacement of the handling device) the configuration- and startup process can be distinctly simplified since the relevant information can be read out of the evaluation unit, which is directly arranged on the handling device.

The construction of the system is furthermore advantageous compared to systems in which the handling device takes place by a central vacuum supply, that is, not by an associated vacuum generator. Here, the vacuum (instead of compressed air) is make available by lines. In particular in the case of long vacuum lines, changes in the vacuum level can be transmitted only comparatively slowly. Therefore, only comparatively slow processes (e.g. receiving and letting go of a workpiece) are possible. In order to increase the productivity, however, a rapidly running handling is often possible, especially in application areas such as the automation of pressing or stamping. It is possible in the present system to perform the generation of a vacuum in the vicinity of the vacuum grippers and to cut only the supply of compressed air on and off by the control valves. This can take place distinctly more rapidly than the global controlling of a vacuum.

The operating data can basically represent different types of information, e.g. pressure, volume flow of compressed air or pneumatic data detected by sensors. The using of status data is also conceivable which reproduce the current operating status and/or a monitoring of the functionality, e.g. a volume flow of the air flowing through the handling device, a cycle number, etc. It can also concern characteristic magnitudes of the handling device by means of which the vacuum generator can carry out a functionally correct vacuum supply, e.g. a typical threshold pressure, typical evacuation time, a current energy consumption or a maximally achieved vacuum in the handling device as a measure for the tightness of the system. Finally, the operating data can also be identification data which makes possible an individual classification of the handling device and, e.g. contains information about the type of the connected handling device. During a replacement of the handling device or upon a further extension of the system an expensive defining of the newly added handling device to a central control can then be eliminated. The system can be flexibly expanded without expensive programming or data management being necessary.

The handling device preferably comprises a carrier or framework on which the vacuum grippers are arranged. The handling device can be constructed, e.g. in the manner of a so-called suction spider with several section grippers arranged on carrier sections projecting in various directions. As a result, even large-area workpieces with uneven surface contours can be grasped.

Even other components can be arranged on the carrier of the handling device. In particular, the vacuum generator can also be arranged on the carrier of the handling device.

The carrier of the handling device can be fastened detachably or replaceably with an appropriate holding section of the system. The holding section of the system is formed, e.g. by an end section of a robotic arm on which the handling device is fastened and with which the handling device can be moved. In particular, the holding section of the system is an end section of an actuator for moving the handling device.

On the other hand, it is conceivable that the vacuum generator is not fastened on the carrier of the handling device but rather on another section of the system, e.g. on the cited holding section of the system. This makes it possible to make a common vacuum generator available for the components arranged on the carrier.

The control valve and the vacuum generator can basically be connected to a structural group, i.e. the control valve can be arranged directly on the vacuum generator and/or enclosed in a common housing section. This design is, however, not obligatory.

The evaluation unit can also be arranged on the carrier of the handling device, preferably fastened in a unit housing, wherein the unit housing is fastened on the carrier.

In order to make a rapid change in the configuration of the system possible, the carrier is preferably replaceably fastened by a rapid replacement system (or rapid replacement coupling) to the holding section of the system. For example, the rapid replacement coupling comprises a coupling section provided on the carrier and an associated coupling section provided on the holding section. The evaluation unit can be integrated, for example, into the carrier-side (i.e. provided on the carrier) coupling section of the rapid replacement coupling.

The control valve and/or the control device for controlling the control valve can be arranged, e.g. on the holding section of the system and therefore jointly act for the handling device to be connected to it. However, it is also conceivable that the control valve and/or the control device is/are fastened on the carrier of the handling device so that an integrated system is formed.

In order to transmit the control signals, the evaluation unit, the control valve and the control device each comprise signal interfaces associated with each other, wherein the signal interfaces are connected by data-transfer means. The data-transfer means can be signal lines. However, it is also conceivable that wireless data-transfer means such as radio stretches are concerned.

The operating data is preferably supplied to the evaluation unit via a measuring access. It is conceivable that the operating data is protected by suitable sensors arranged, e.g. on the vacuum generator, the handling device and/or the at least one vacuum gripper. The sensors can be constructed, e.g., for detecting pressure, volume flow or the like.

The control valve is preferably combined with the associated control device to a structural unit, e.g. in a common housing. As explained, the latter can also be arranged on the carrier of the handling device or on another section of the system. The design as an intelligent control valve makes possible a comfortable retrofitting and maintenance.

On the other hand, it is conceivable that the evaluation unit and the control device are combined to a structural unit. In this design the evaluation and the control are spatially combined so that only short signal paths are necessary. The combination unit consisting of evaluation unit and control unit can be connected to the valve via appropriate control lines or wireless data-transfer means.

In particular, a storage device is provided in the evaluation unit, by means of which operating data of the vacuum generator and/or of the handling device is stored. In particular, recognition data (also viewed as operating data) is deposited in the storage device which identifies the handling device. In so far the evaluation unit can also act as a recognition unit for the handling device. Therefore, in an exchange of the handling device in the system the recognition data can be directly read out, which simplifies the configuration process.

The cited data-transfer means are preferably basically constructed in such a manner that that the communication connection is automatically established when the handling device is connected to the corresponding holding section of the system. An appropriate communication connection interface is preferably integrated into the cited rapid replacement coupling and is automatically connected when the handling device is fastened to the system.

The control valve is designed in particular as a proportional valve so that the fluid pressure made available to the vacuum generator and/or the flow-through to the vacuum generator can be continuously regulated. The control valve can basically be arranged on the carrier of the handling device or, however, on the holding section of the system.

The initially posed problem is also solved by a method according to the present invention, in accordance with which the previously described system is operated.

The system makes available a compressed air supply system to which the handling device (comprising at least one vacuum gripper) is connected. The connection takes place via a vacuum generator (in particular an ejector) that can be operated with compressed air and which makes the vacuum for the vacuum grippers available.

According to the method operating data concerning the vacuum generator and/or the handling device is made available and evaluated in a decentralized manner in an evaluation unit provided on the handling device. Control signals for controlling a control valve are generated as a function of the evaluated operating data. The control valve acts between the compressed air supply system and the vacuum generator and controls the supply of compressed air as a function of the control signals transmitted from the evaluation unit.

The making available of the operating data can take place as explained by deposited data of the evaluation unit or by measured data concerning the vacuum generator and/or the handling device.

In particular, theoretical values for characteristic values of the operation (in particular concerning the vacuum grippers and/or the vacuum generator) are deposited in the evaluation unit, wherein actual values for the characteristic values of the operation are supplied as operating data to the evaluation unit, e.g. in the form of measured values. The actual values can be aligned in the evaluation unit with the theoretical values and in the case of a dropping below or of an exceeding of the theoretical values the evaluation unit can transmit appropriate control signals to the control valve or to a control device associated with it.

BRIEF DESCRIPTION OF THE DRAWING

The invention is explained in detail in the following using the figures.

In the figures.

In the following description and in the figures the same reference numerals are used for identical features or features corresponding to each other.

DETAILED DESCRIPTION OF THE BEST MODE OF THE INVENTION

Figure 1:
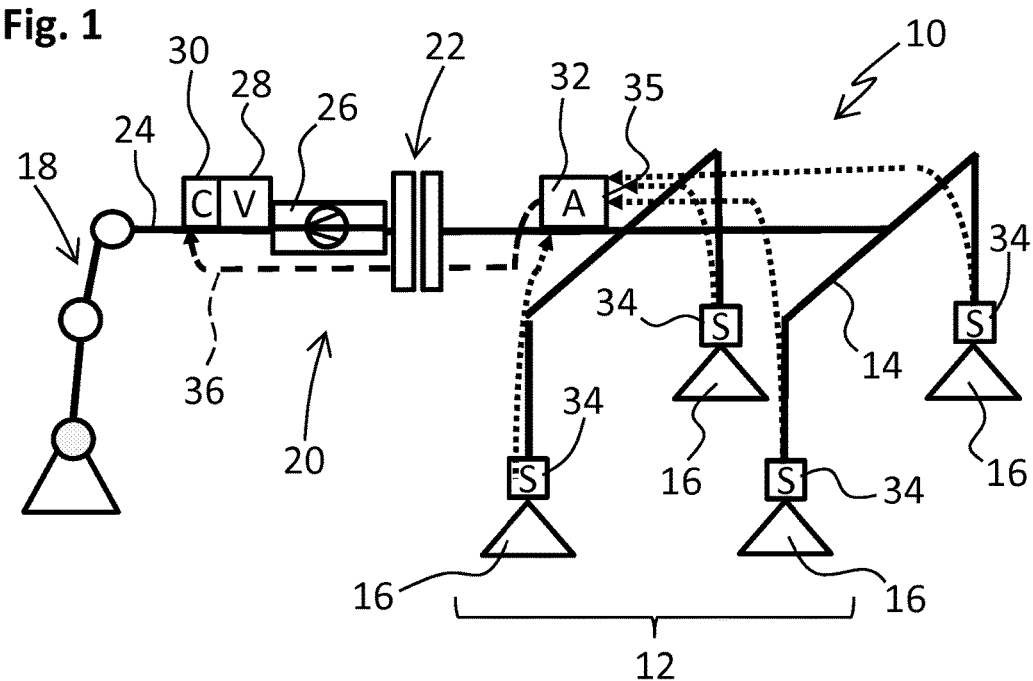
FIG. 1 Shows a sketched view of a first embodiment of the system.

FIGS. 1 to 4 show a system 10 for handling a workpiece that is not shown in detail. The system 10 comprises a handling device 12 constructed in the example shown as a suction spider. The handling device 12 comprises a carrier 14 like a framework on which a plurality of vacuum grippers (here: suction grippers) 16 for fixing the workpiece are arranged.

The system 10 also comprises an actuator 18 which is shown like a sketched robotic arm. This arm serves to move the handling device 12. The handling device 12 is arranged on a holding section 20 of the actuator 18 in such a manner that that it can be fastened and detached by a rapid replacement coupling 22. To this end the rapid replacement coupling comprises a coupling section (shown in the figures by vertical beams) on the carrier 14 and one on the holding section 20.

The system 10 comprises a compressed air supply system 24 that is not shown in detail that is supplied from the actuator 18 in the examples shown. The vacuum required for the vacuum grippers 16 is generated by a vacuum generator 26. The vacuum generator 26 generates a vacuum, e.g. according to the suction jet pump principle, from the compressed fluid (especially compressed air) made available by the compressed air supply system 24. In particular, the vacuum generator 26 is constructed as an ejector. As is apparent, e.g. from FIG. 4, several vacuum generators 26 can also be provided.

A control valve 28 is fluidically connected in front of the vacuum generator 26. The control valve 28 controls the volume flow and/or the pressure supplied to the vacuum generator 26. The control valve 28 is constructed, e.g. as a continuously controllable proportional valve. In order to control the control valve, it is associated with a control device 30. The control device 30 can also control several control valves 28 (cf. FIG. 4).

Furthermore, an evaluation unit 32 is integrated in the handling device 12, in particular on the carrier 14 in the handling device 12. As will be explained in detail in the following, operating data concerning the vacuum generator or vacuum generators 26 and/or concerning the handling device 12, in particular concerning the vacuum gripper 16 are supplied to the evaluation unit 32. The evaluation unit 32 evaluates this operating data and generates control signals from it which are transmitted to the control device 30 for controlling the control valve 28.

The systems 10 shown in the FIGS. 1 to 4 differ from each other in particular in that the different functional units (e.g. evaluation unit 32, vacuum generator 26, control valve 28, control device 30, . . . ) are arranged at different positions and/or are combined to different structural units.

Figure 2:
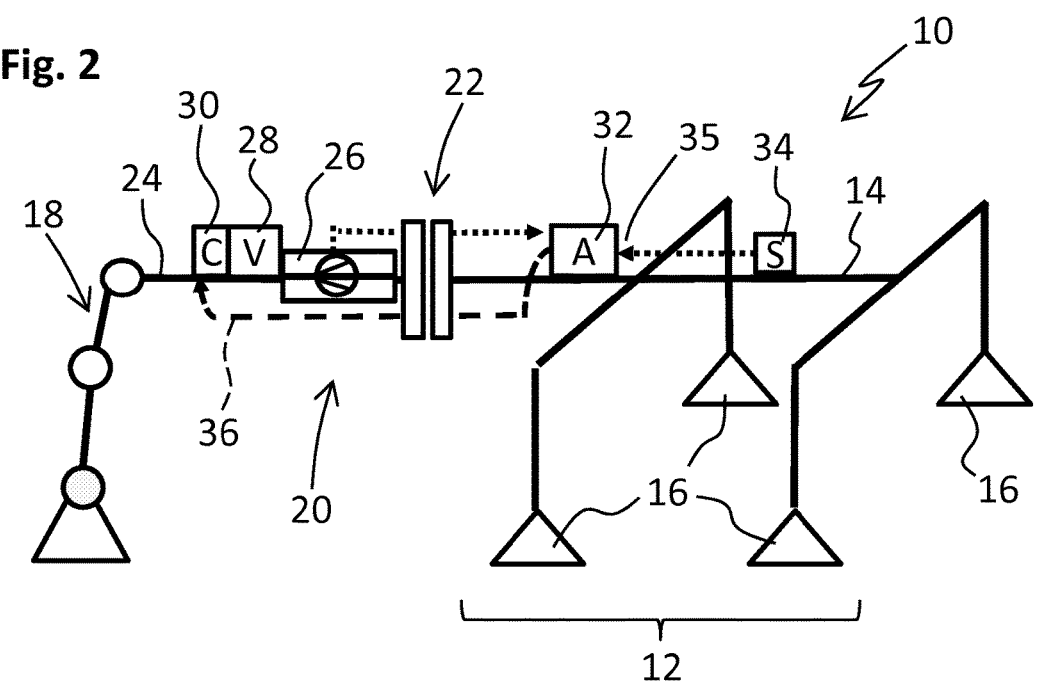
FIG. 2 Shows a sketched view of another embodiment.

According to one embodiment the vacuum generator 26 is arranged on the holding section 20 of the actuator 16 (cf. FIGS. 1 and 2). The control valve 28 connected in front of the vacuum generator 26 is also arranged on the holding section 20. In particular, it is conceivable that the control valve 28 and the vacuum generator 26 are combined to a structural unit, e.g. in a common housing. The control device 30 can also be provided on the holding section 20. The control device 30 can also be connected to the control valve 28 and/or to the vacuum generator 26 to a structural unit.

However, it is also possible that the at least one vacuum generator is integrated into the handling device 12 (FIGS. 3 and 4), in particular arranged on the carrier 14. A vacuum generator 26 for all vacuum grippers 16 can be provided here (cf. FIG. 3) or a vacuum generator 26 can be associated with each vacuum gripper 16 (cf. FIG. 4).

Figure 3:
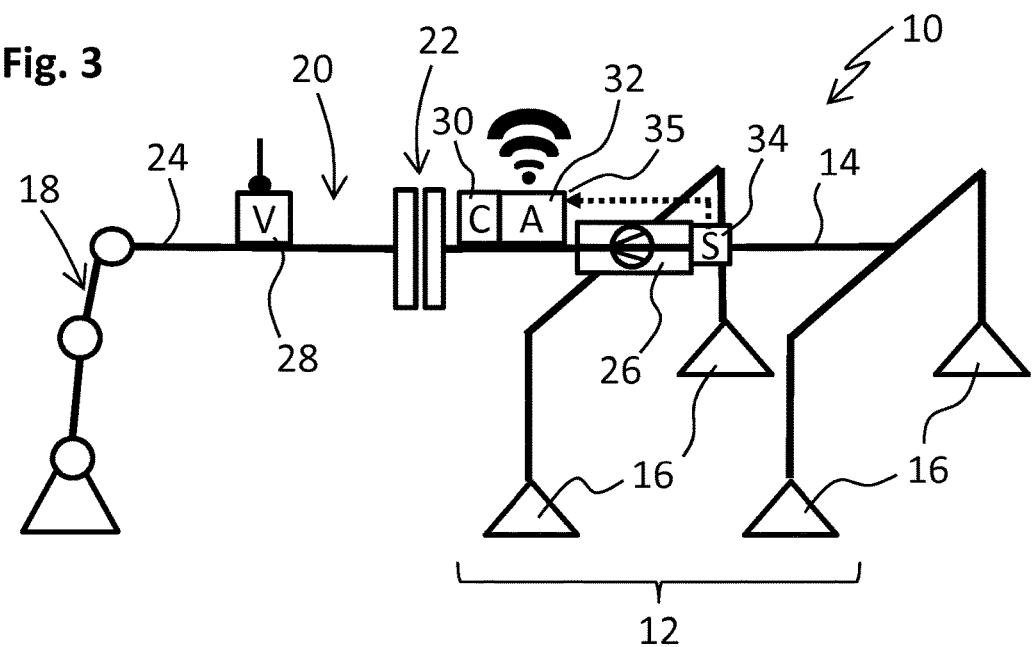
FIG. 3 Shows a sketched view of a third embodiment.
Figure 4:
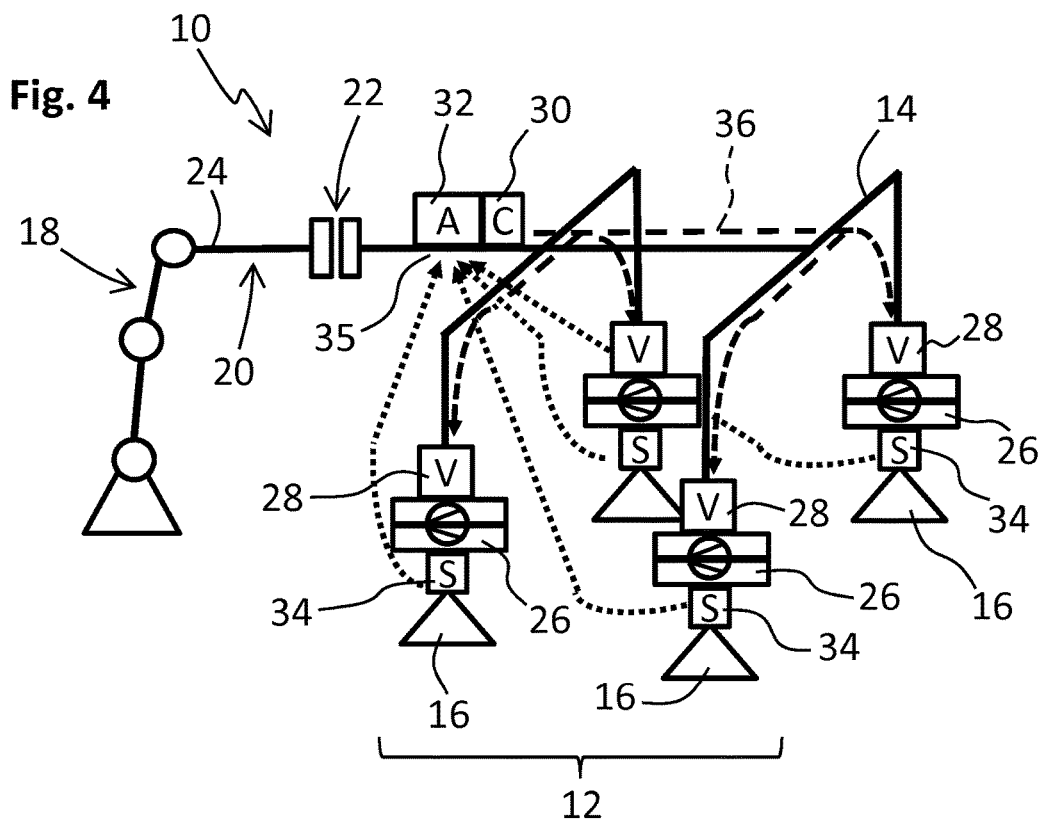
FIG. 4 Shows a sketched view of a fourth embodiment.

The control valve 28 can then, e.g. be arranged on sides of the holding section 20 (FIG. 3) or can be arranged in common with the vacuum generator 26 on the handling device 12 (cf. FIG. 4).

The control device 30 serving for the control can on the one hand be arranged in common with the control valve (cf. FIGS. 1 and 2) and on the other hand the control device 30 can be arranged in common with the evaluation unit 32 on the handling device 12, and in particular be connected with the evaluation device 32 to a structural unit (cf. FIGS. 3 and 4). Both embodiments offer structural advantages since on the one hand the control device 30 serves to control the control valve 28 and on the other hand the control device 30 receives the corresponding control signals from the evaluation unit 32.

In order to determine the operating data, in particular sensors 34 are provided which are, e.g. directly associated with the vacuum gripper 16 (cf. FIG. 1 and FIG. 4) and/or are associated directly with the vacuum generator 26 (cf. FIG. 3). They can also be sensors 34 that are arranged on the handling device 12 (e.g. on the carrier 14), e.g. in order to detect the approach of a workpiece. The determined operating data is supplied from the sensors to the evaluation unit 32. For this, the evaluation unit 32 can comprise appropriate measuring inputs 35. The supply of the operating data from the sensors 34 via the measuring inputs 35 is represented in the FIGS. 1 to 4 by a dotted line.

The evaluation unit 32 transmits the control signals generated from the operating data via suitable data-transfer means 36 to the control device 30 and/or to the control valve 28. Various designs are possible here. The FIGS. 1 and 2 show data-transfer means 26 which establish a communication connection between the evaluation unit and the control device 30 upon the connection of the rapid replacement coupling 22. This data-transfer means 26 can be, e.g. data lines.

FIG. 3 shows an embodiment in which the control device 30 forms a structural unit with the evaluation unit 31, wherein the control signals are transmitted wirelessly to the control valve 28. It is also conceivable here, in deviation from the representation, that the control device 30 is arranged in common with the control valve and that the wireless data-transfer takes place between the evaluation unit 32 and the control device 30.

In the case of FIG. 4, the data-transfer means 36 can be integrated, e.g., in the carrier 14 of the handling device 12, e.g. as permanently laid control lines.

In order to transfer the control signals the evaluation unit 32, the control device 30 and optionally the control valve 28 comprise appropriate signal interfaces (not shown in detail).

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A system (10) for handling workpieces, comprising:
   a handling device (12) which comprises at least one vacuum gripper (16) for drawing a workpiece in by suction,
   at least one vacuum generator (26) that can be operated by the supply of compressed air for supplying the at least one vacuum gripper (16) with vacuum,
   at least one controllable control valve (28) configured to control the supply of compressed air to the at least one vacuum generator (26), wherein the control valve (28) acts between a compressed air supply (24) for the system (10) and the vacuum generator (26),
   wherein the at least one control valve (28) is associated with a control device (30) for the proper control of the at least one control valve (28) as required,
   wherein the handling device comprises an evaluation unit (32) configured for evaluating operating data of the at least one vacuum generator (26) and/or configured for evaluating operating data of the handling device (12) and configured for generating control signals as a function of the evaluated operating data,
   wherein the control device (30) controls the at least one control valve (28) as a function of the control signals transmitted from the evaluation unit (32),
   wherein the handling device (12) comprises a carrier (14) which is configured to be fastened on and detached from a holding section (20) of the system,
   wherein the at least one vacuum gripper (16) and the evaluation unit (32) are arranged on the carrier (14), and
   wherein the vacuum generator (26) is arranged on the holding section (20) of the system.

2. The system according to claim 1, characterized in that a plurality of vacuum grippers (16) are fastened on the carrier (14).

3. The system according to claim 1, characterized in that the at least one control valve (28) and/or the control device (30) is/are arranged on the holding section (20) of the system on which holding section the handling device (12) can be fastened.

4. The system according to claim 1, characterized in that the evaluation unit (32) comprises at least one measuring input (35) for receiving the operating data of the at least one vacuum generator (26) and/or of the handling device (12).

5. The system according to claim 1, characterized in that the at least one vacuum generator (26) and/or the handling device (12) and/or the at least one vacuum gripper (16) comprise(s) sensors (34) for detecting operating data.

6. The system according to claim 1, characterized in that the control device (30) is combined with the at least one control valve (28) to a structural unit.

7. The system according to claim 1, characterized in that the evaluating unit (32) comprises a storage device in which operating data of the at least one vacuum generator (26) and/or of the handling device (12) can be stored.

8. The system according to claim 1, characterized in that the at least one control valve (28) comprises a proportional valve.

9. The system according to claim 1, characterized in that the carrier (14) is replaceably fastened by a rapid replacement coupling (22) on the holding section (20).

10. The system according to claim 9, characterized in that the evaluation unit (32) is arranged on a coupling section of the rapid replacement coupling (22) which coupling section is provided on the carrier (14).

11. The system according to claim 1, characterized in that the evaluation unit (32) and/or the at least one control valve (28) and/or the control device (30) comprise(s) associated signal interfaces for transmitting the control signals, wherein the signal interfaces are connected to each other by data-transfer means (36).

12. The system according to claim 11, characterized in that the data-transfer means (36) is constructed in such a manner that the connection is established when the handling device is arranged on the system.

13. A method of operating the system (10) according to claim 1, wherein the system (10) makes the compressed air supply system (24) available and comprises the handling device (12) that comprises the at least one vacuum gripper (16) for drawing in a workpiece by suction, and comprises the at least one vacuum generator (26) that can be operated by the supply of compressed air for supplying the at least one vacuum gripper (16) with a vacuum, wherein operating data of the at least one vacuum generator (26) and/or of the handling device (12) is evaluated in a decentralized manner in the evaluation unit (32) provided on the handling device (12), and wherein the at least one control valve (28) controls the supply of compressed air from the compressed air supply system (24) to the at least one vacuum generator (26) as a function of the control signals transmitted from the evaluation unit (32).

14. The method according to claim 13, characterized in that theoretical values are deposited in the evaluation unit (32) for operating recognition magnitudes and that actual values for the operating recognition magnitudes are supplied as operating data to the evaluation unit, wherein the actual values are compared in the evaluation unit (32) with the theoretical values, and wherein the control signals are generated upon a deviation of actual values and theoretical values.

* * * * *